(12) United States Patent
Lee

(10) Patent No.: US 6,965,486 B2
(45) Date of Patent: Nov. 15, 2005

(54) ZOOM CAMERA HAVING LENS BARREL ASSEMBLY ADJUSTABLE FOCUS AND RESOLUTION POWER OF LENS

(75) Inventor: Seon-Ho Lee, Changwon (KR)

(73) Assignee: Samsung Techwin Co., Ltd., (KR)

( * ) Notice: Subject to any disclaimer, the term of this patent is extended or adjusted under 35 U.S.C. 154(b) by 24 days.

(21) Appl. No.: 10/823,860

(22) Filed: Apr. 14, 2004

(65) Prior Publication Data

US 2004/0207931 A1 Oct. 21, 2004

(30) Foreign Application Priority Data

Apr. 15, 2003 (KR) .................... 10-2003-0023779

(51) Int. Cl.[7] .............................. G02B 7/02; G02B 15/14
(52) U.S. Cl. .................. 359/819; 359/694; 359/703
(58) Field of Search .............................. 359/819, 813, 359/821, 704, 703, 694, 822, 823

(56) References Cited

U.S. PATENT DOCUMENTS 6,204,979 B1 * 3/2001 Matsui .................. 359/819

* cited by examiner

*Primary Examiner*—Timothy Thompson
(74) *Attorney, Agent, or Firm*—St. Onge Steward Johnston & Reens LLC

(57) ABSTRACT

A zoom camera having a lens barrel assembly with adjustable focus and resolution power of photographing lens, the zoom camera including a zoom lens barrel assembly including a plurality of barrels for performing a zooming and focusing operation while reciprocating in a direction of an optical axis, the zoom lens barrel assembly being fixed on a camera body, a rotational barrel coupled to one of the lens barrels of the zoom lens barrel assembly and rotatable and movable in the direction of the optical axis for adjusting the focus of the lens, and a lens frame containing a lens and rotatably coupled to the rotational barrel for adjusting the resolution power of the lens.

22 Claims, 7 Drawing Sheets

ZOOM CAMERA HAVING LENS BARREL ASSEMBLY ADJUSTABLE FOCUS AND RESOLUTION POWER OF LENS

This application claims priority of pending Korean Application No. 2003-23779, filed on Apr. 15, 2003.

FIELD OF THE INVENTION

The present invention relates to a camera, and more particularly, to a zoom camera having a lens barrel assembly that is designed to be capable of adjusting the focus position and resolution power of a lens to compensate the focus and resolution power errors often caused by a production tolerance during a manufacturing process of the lens barrel assembly.

BACKGROUND OF THE INVENTION

A zoom camera, whether it is a film type camera or a digital camera, generally includes a zoom lens barrel assembly having a zooming function for varying magnification (i.e., a focal length) of a photographing lens and a focusing function for varying a focal point in response to the distance to a subject.

The zoom lens barrel includes front and rear lens barrel assemblies. The rear lens barrel assembly includes a lens whose focal length may be slightly deviated from the optimal by a production tolerance. In order to adjust the deviated focal length, a plate having a predetermined thickness is inserted between the lens barrel and a film or between the lens barrel and a charging surface of a charge coupled device (CCD) in the course of assembling the lens to the lens barrel. Alternatively, a screw or a cam may be used to adjust the focal length.

The above-described adjusting methods have an advantage of accurately adjusting the focus at a central portion of the lens. However, there is still a problem that the focus at a periphery of the lens (i.e., a resolution power) may be varied due to the production and assembling tolerances, thus deteriorating a resolution power of the lens or the zoom camera. In this disclosure, adjusting of the focus means an adjustment or correction activity to make a lens barrel or a whole camera incorporating such a lens barrel to be in focus with respect to an infinity subject.

In order to adjust the focus and the resolution power at the periphery of the lens, the barrel should be disassembled, or the barrel should be rotated and reassembled, or the lens should be replaced with a new one, after which a test should be performed again. This may cause the increase of the working time, deteriorating the productivity.

SUMMARY OF THE INVENTION

Accordingly, the present invention is directed to a zoom camera having a zoom lens barrel assembly that substantially obviates one or more problems described above due to limitations and disadvantages of the conventional art.

It is an objective of the present invention to provide a zoom camera having a lens barrel assembly that can adjust the focus of the lens barrel assembly by adjusting the axial location of a lens, and also the resolution power at a periphery of a lens by rotating the lens for reorientation of the lens along the optical axis of the camera.

To achieve the object, the present invention provides a zoom lens barrel assembly for a camera, comprising: a plurality of lens barrels for performing a zooming and focusing operation while reciprocating in a direction of an optical axis; a rotational barrel coupled with one of the plurality of lens barrels and configured to rotate and move in the direction of the optical axis for adjusting the focus of the zoom lens barrel assembly; and a lens frame comprising a lens and rotatably coupled with the rotational barrel for adjusting a resolution power of the lens barrel assembly.

According to another aspect of the present invention, there is provided a zoom camera having a lens barrel assembly, the lens barrel assembly of the camera comprising: a plurality of lens barrels reciprocating in a direction of an optical axis for a zooming operation of the camera via a driving source of the camera; a lens guide ring coupled to one of the lens barrels and movable in the direction of the optical axis, the lens guide ring including a circumferential screw at an inner circumference of the lens guide ring; a rotational barrel including at an outer circumference a corresponding screw engaged with the screw of the lens guide ring for moving the rotational barrel in the direction of the optical axis by rotating the rotational barrel to adjust the focus of the camera, the rotational barrel including a rotation guide formed at an inner circumference thereof; and a lens frame comprising a lens, the lens frame coupled with the rotation guide of the rotational barrel and rotatable relative to the rotational barrel to adjust a resolution power of the camera.

According to still another aspect of the present invention, there is provided a zoom camera having a lens barrel assembly, the lens barrel assembly of the camera comprising: a plurality of lens barrels reciprocating in a direction of an optical axis for a zooming operation of the camera via a driving source of the camera; a lens guide ring coupled to one of the lens barrels and movable in the direction of the optical axis, the lens guide ring including a circumferential screw at an inner circumference thereof; a rotational barrel including at an outer circumference a corresponding screw engaged with the screw of the lens guide ring for moving the rotational barrel in the direction of the optical axis by rotating the rotational barrel to adjust the focus of the camera, the rotational barrel including first and second guide projections at an inner circumference thereof; and a lens frame comprising a lens, the lens frame including a third projection at an outer circumference thereof coupled with the first and second guide projections of the rotational barrel for rotating the lens frame relative to the rotational barrel to adjust a resolution power of the camera.

According to still another aspect of the present invention, the lens barrel assembly is first fixed on a jig. Then, when the rotational barrel is rotated in one direction by a tool (such as the pincette) inserted in a focus adjusting groove of the rotational barrel, the rotational barrel rotates and moves in the direction of the optical axis. As a result, the lens frame also moves together. The rotation of the rotational barrel is stopped by a worker at a location where the focus is accurately adjusted, and the rotational barrel and the fixing barrel are fixed to each other by, for example, a bonding process. In addition, when the lens frame is rotated by the tool inserted in a resolution power adjusting groove of the (rear) lens frame, the lens frame rotates, after which a worker fixes the (rear) lens frame on the rotational barrel at a location where the resolution power at the peripheral upper, lower, left and right portions of the lens becomes maximum while referring to the resolution power chart.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
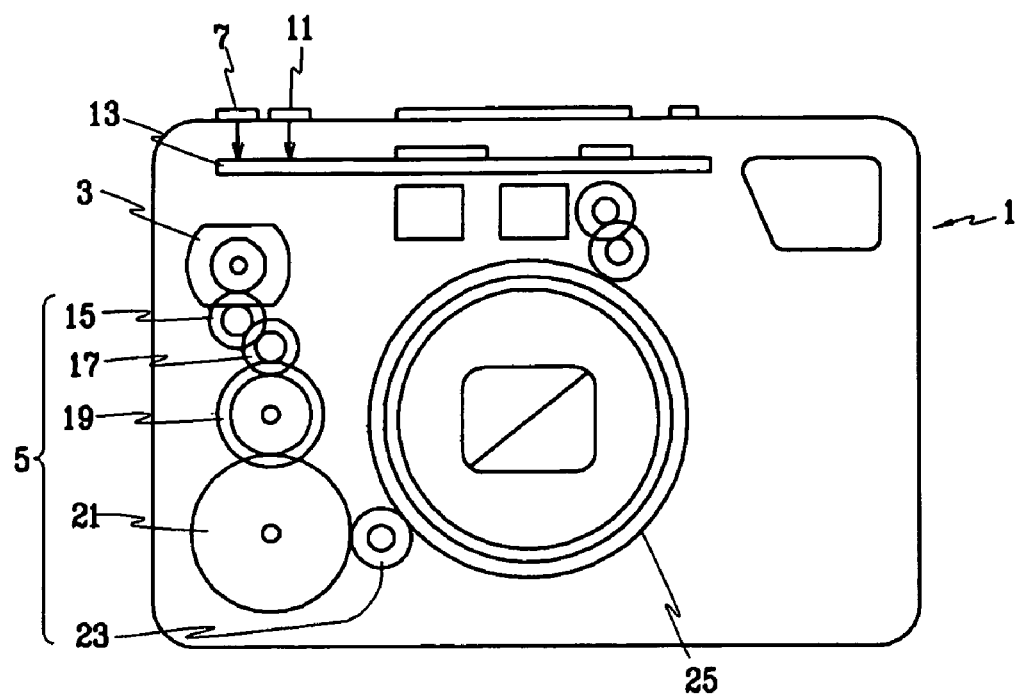
FIG. 1 is a front schematic view of a zoom camera according to one preferred embodiment of the present invention.
Figure 2:
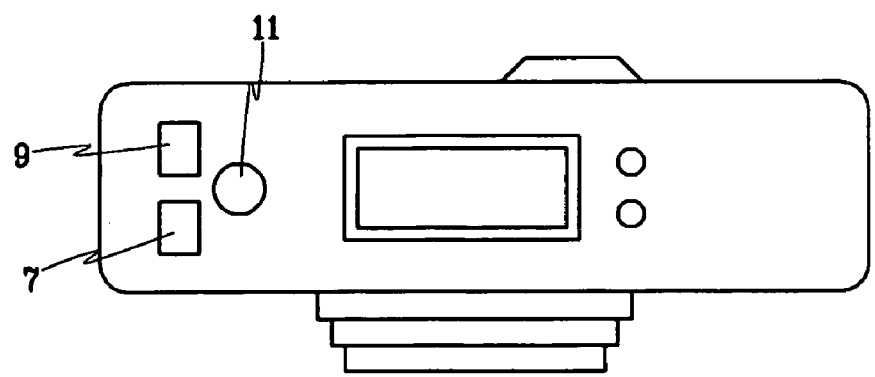
FIG. 2 is a plane view of FIG. 1.

FIGS. 1 and 2 show a camera according to one preferred embodiment of the present invention.

As shown in the drawing, a zoom camera comprises a camera body, 1, a zoom motor 3 that is a zoom driving source and a power transmission gear group 5 for reducing the rotational force and transmitting the same to a barrel.

Provided on a top of the camera body 1 are tele and wide switches 7 and 9 and a release switch 11. The tele and wide switches 7 and 9 are associated with a control circuit 13 received in the camera body 1 to drive the zoom motor 3.

The zoom motor 3 is installed in the camera body 1 and is associated with the control circuit 13 such that it can rotate clockwise or counterclockwise in response to the operation of the tele and wide switches 7 and 9, thereby realizing the zooming operations.

The power transmission gear group 5 comprises a first reduction gear 15 for transmitting driving force of the zoom motor 3, a second reduction gear 17 engaged with the first reduction gear 15, a third reduction gear 19 engaged with a second reduction gear 17, and a fourth reduction gear 21 engaged with the third reduction gear 19. The power transmission gear group 5 functions to reduce the driving force of the zoom motor 3 but the number of gears thereof is not limited to this embodiment. That is, the number of gears may be varied in accordance with the design of the cameras.

In addition, the fourth reduction gear 21 is engaged with a barrel idle gear 23 (see FIGS. 1 and 3) to transmit the driving force of the zoom motor 3 to the zoom lens barrel assembly 25 so that portions of the barrel assembly can move in a direction of an optical axis for the zooming operation.

Figure 3:
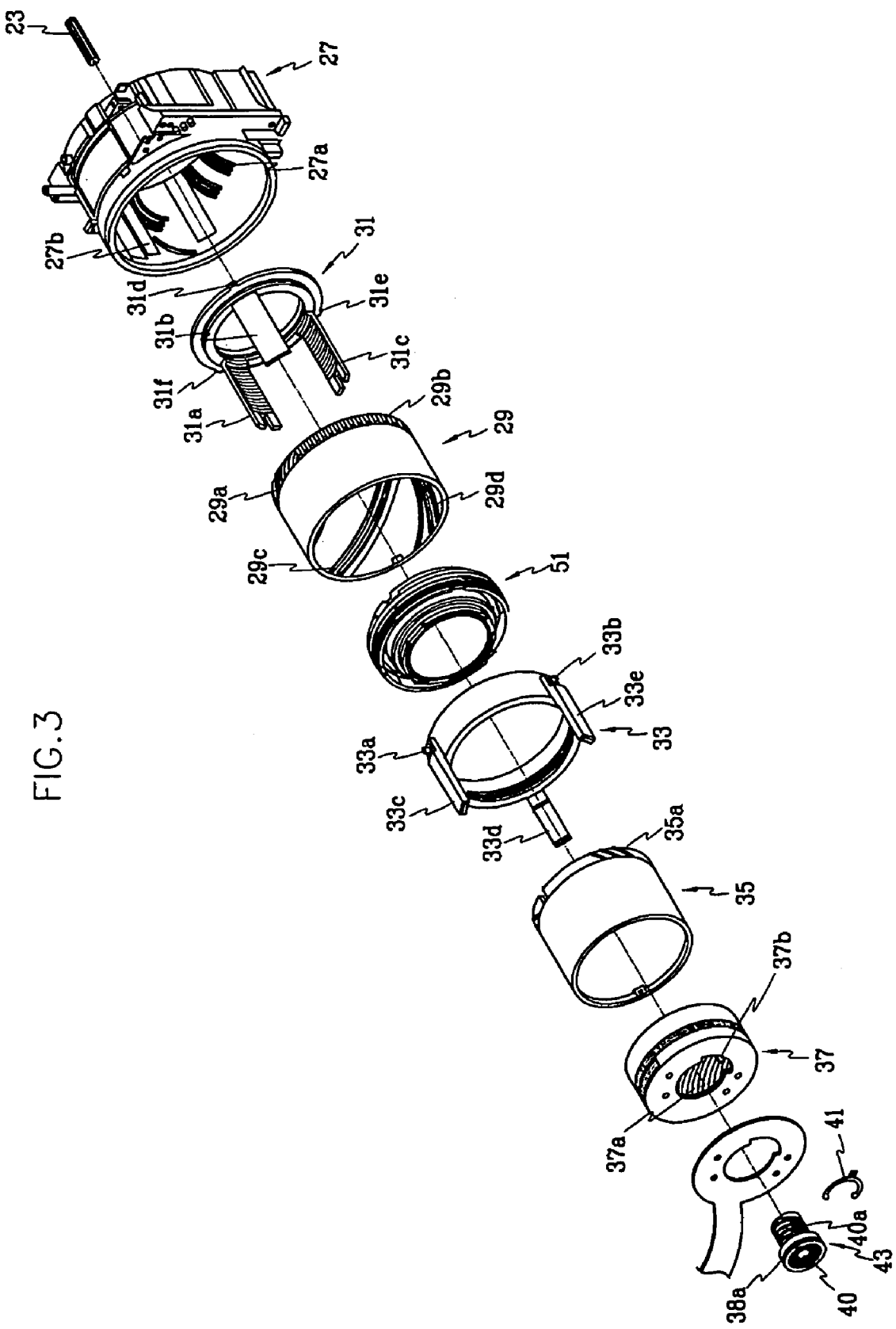
FIG. 3 is an exploded perspective view of a lens barrel assembly of a zoom camera according to one preferred embodiment of the present invention.

FIG. 3 shows an exploded perspective view of a zoom lens barrel assembly according to one preferred embodiment of the present invention.

As shown in the drawing, a lens base 27 is fixed on the camera body 1. A plurality of helicoids grooves 27a are formed on an inner circumference of the lens base 27. A reciprocal guide groove 27b is also formed on the inner circumference of the lens base 27 in a direction of the optical axis. The barrel idle gear 23 engaged with the fourth reduction gear 21 is coupled on an end of the lens base 27.

A cam ring 29 is provided with a helicoids projection 29a that is engaged with the helicoids groove 27a to be movable in the direction of the optical axis while rotating. A gear 29b is formed next to the helicoids projection 29a and engaged with the barrel idle gear 23 such that it can rotate and move the cam ring 29 in the direction of the optical axis by receiving the driving force from the zoom motor 3.

The cam ring 29 is provided at an inner circumference with a zoom ring guide helicoids groove 29c and a rear lens frame guide helicoids groove 29d.

A guide ring 31 is coupled on a film side of the cam ring 29. By a relative motion of the guide ring 31 to the cam ring 29 as will be described below, a zoom ring 35 can linearly move in the direction of the optical axis.

The guide ring 31 is provided at an outer circumference with projections 31d, 31e and 31f that are engaged with linear guide grooves 27b (only one is shown in the drawing) formed on the inner circumference of the lens base 27 such that it can relatively slide in the direction of the optical axis while allowing relative rotation of the cam ring 29 with respect to the guide ring 31.

The guide ring 31 is provided with linear guide members 31a, 31b and 31c spaced apart from each other at a predetermined interval and extended in the direction of the optical axis.

A rear lens guide ring 33 is provided at an outer circumference with a plurality of cam pins 33a and 33b (only two is shown in the drawing with hidden one(s) omitted for simplicity purposes). The cam pins 33a and 33b are engaged with the rear lens guide helicoids groove 29d provided on the inner circumference of the cam ring 29 to allow the rear lens guide ring 33 to move in the direction of the optical axis.

The rear lens guide ring 33 is provided with three linear guide members 33c, 33d and 33e. The rear lens guide ring 33 is provided at an inner circumference with a circumferential female screw 33k (see FIG. 5). The circumferential screw groove 33k is screw-coupled with a rear lens barrel assembly 51 (FIG. 5) that will be described later to allow the rear lens barrel assembly 51 to rotate and move in the direction of the optical axis, thereby adjusting the focus of a rear lens that will be also described later.

The zoom ring 35 is provided at an end of the outer circumference with a male helicoides 35a engaged with the zoom ring guide helicoids groove 29c of the cam ring 29 such that it can linearly move in the direction of the optical axis by the linear guide ring 31.

Figure 4:
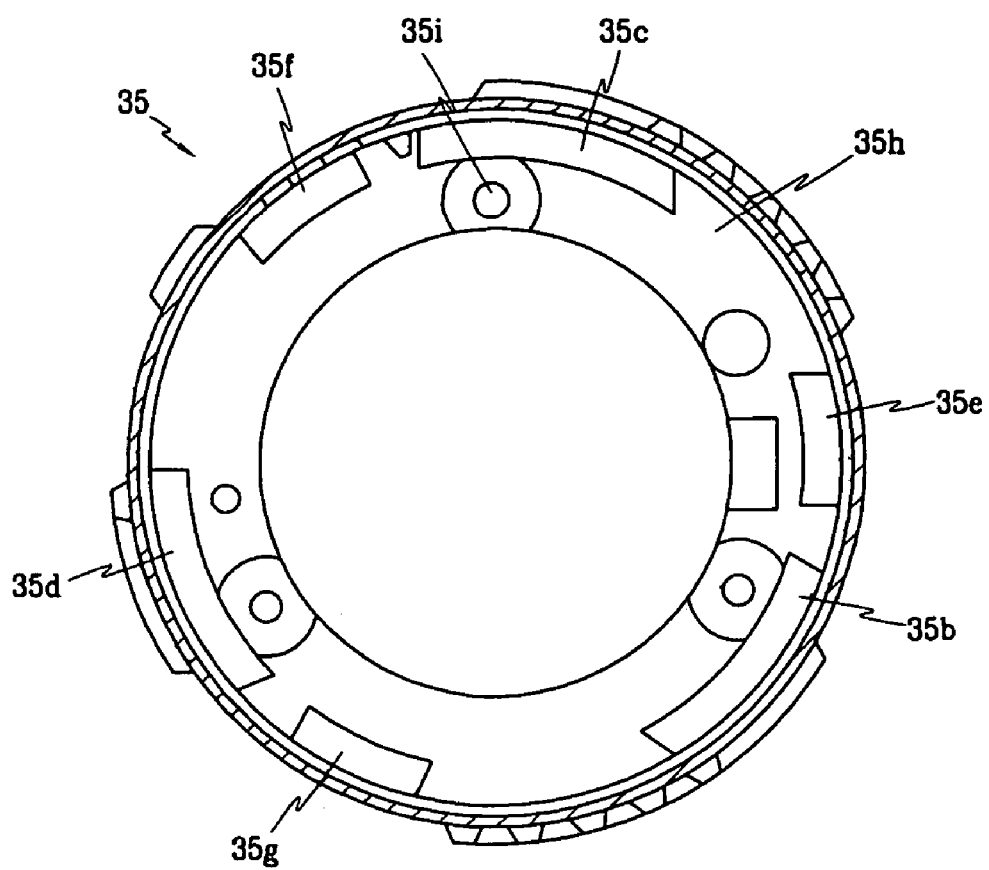
FIG. 4 is a front view of the zoom ring depicted in FIG. 3.

As shown in FIG. 4, the zoom ring 35 is provided at an inner circumference with guide grooves 35b, 35c and 35d in which the linear guide members 31a, 31b and 31c of the guide ring 31 are inserted. Therefore, the zoom ring 35 is designed to linearly move in the direction of the optical axis by the linear guide members 31a, 31b and 31c.

The zoom ring 35 is further provided with guide grooves 35e, 35f and 35g in which the linear guide members 33c, 33d and 33e of the rear lens guide ring 33. Therefore, the rear lens guide ring 33 is designed to relatively move in the direction of the optical axis with respect to the zoom ring 35.

A shutter block 37 is coupled in the zoom ring 35. The shutter block 37 is provided at an inner circumference with a helicoids portion 37a engaged with a front lens 40. That is, the front lens 40 is provided at an outer circumference with a helicoids portion 40a inserted in the helicoids portion 37a of the shutter block 37. A focus adjusting lever 41 is rotatably coupled on an outer circumference of a front lens barrel 43 fixed on an outer circumference of the front lens 40 and is provided with a projection 41a having a distal groove coupled with a focus adjusting pin 37b provided on the shutter block 37.

Accordingly, the focusing operation of the front lens 40 is realized as the front lens 40 linearly moves while rotating.

Figure 5:
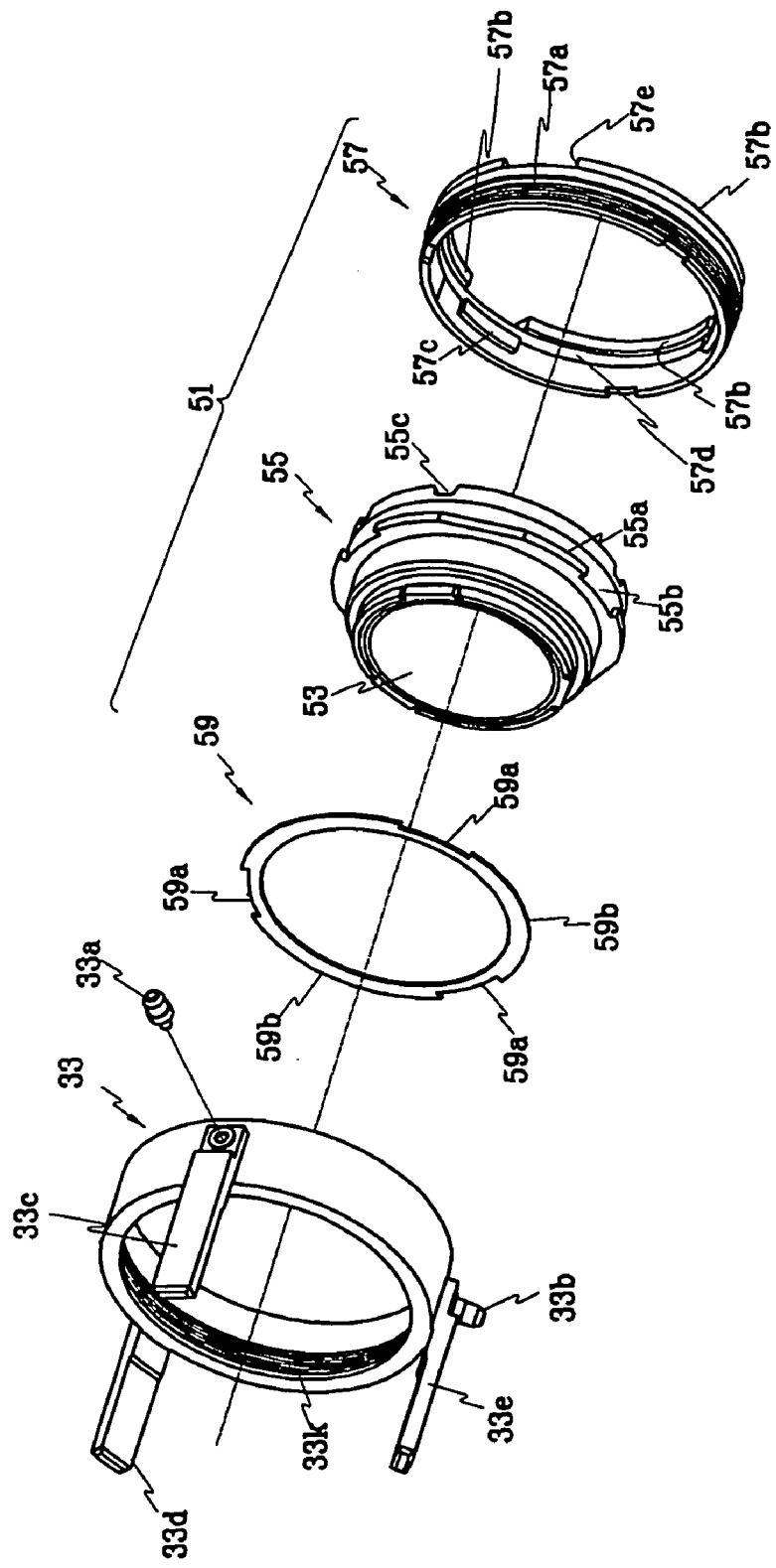
FIG. 5 is an exploded perspective view of a rear lens barrel assembly according to one preferred embodiment of the present invention.

Meanwhile, as shown in FIG. 5, the rear lens barrel assembly 51 is coupled on the rear lens guide ring 33. The rear lens barrel assembly 51 comprises a rear lens frame 55 on which the rear lens 53 is coupled, a rotational barrel 57, on an inner circumference of which the rear lens frame 55 is coupled, and a fixing plate 59 for preventing the rear lens frame 55 from separating from the rotational barrel 57.

The rotational barrel 57 is provided at an outer circumference with a male screw engaged with the female screw 33k of the rear lens guide ring 33. The rotational barrel 57 is provided at an inner circumference with first projections 57b that are disposed at an interval of 120° and second projections 57c that are disposed at an interval of 120°. Provided between the first and second projections 57b and 57c is a guide portion 57d allowing the rear lens frame to rotate in a circumferential direction.

The rear lens frame 55 is provided at an outer circumference with a plurality of third projections 55a that can be blocked by the first projections 57b of the rotational barrel 57 to suppress the movement of the rear lens frame 55 in the direction of the optical axis. Formed between the third projections 55a are grooves 55b in which the second projections 57c of the rotational barrel 57 can be inserted.

Likewise, the rotational barrel 57 and the rear lens frame 55 are engaged with each other such that the rear lens 53 cannot move in the direction of the optical axis but can rotate to change the orientation of the rear lens 53. However, the structure of the rotational barrel 57 and the rear lens frame 55 are not limited to this particular embodiment. That is, any structures that do not allow its relative movement in the direction of the optical axis but permitting rotation therebetween can be employed to the present invention.

Figure 8:
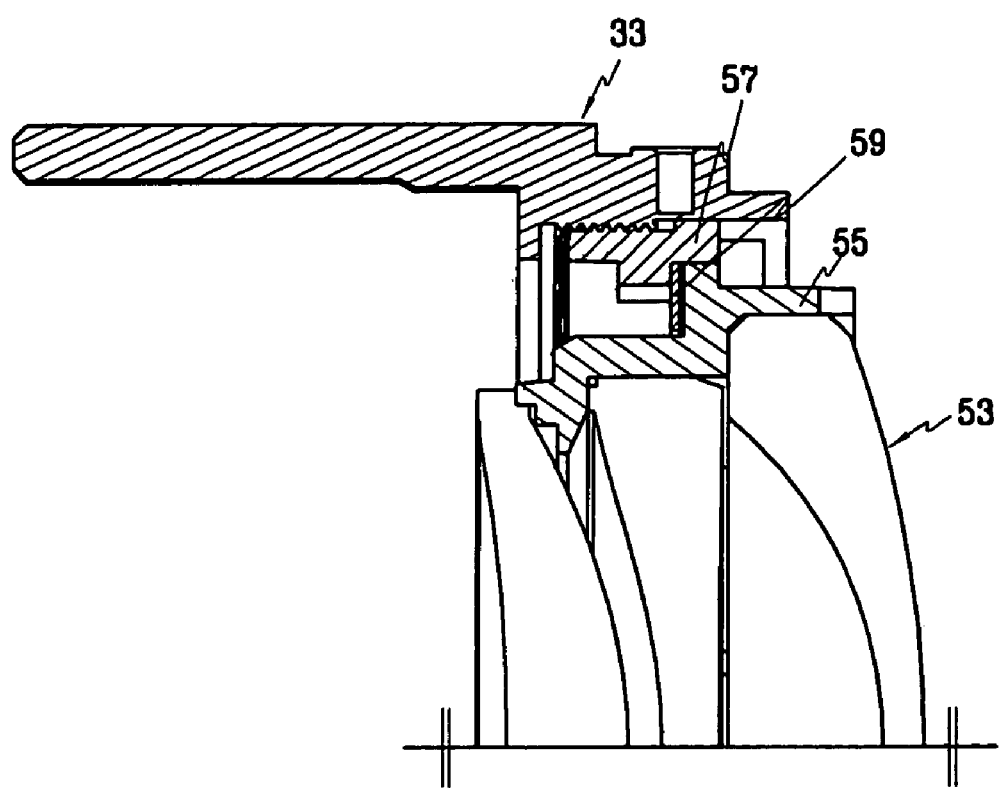
FIG. 8 is a sectional view of a rear lens barrel assembly.

The fixing plate 59, as shown in FIG. 8, functions to prevent the rear lens frame 55 fitted within the rotational barrel 57 from being detached from the rotational barrel 57. In particular, the fixing plate 59 is provided with a plurality of grooves 59a in which the second projections 57c of the rotational barrel 57 can be inserted. The fixing plate 59 is further provided with fourth projections 59b between the grooves 59a to stop the third projections 55a, thereby preventing the third projections 55a from being detached toward the subject.

That is, the rear lens barrel assembly 51 is coupled to the rear lens guide ring 33 such that it can move in the direction of the optical axis while rotating to adjust the focus of the rear lens 53. The rear lens frame 55 is rotatably coupled on the rotational barrel 57 so that it is possible to adjust the resolution power by rotating the rear lens 53 clockwise or counterclockwise.

Figure 6:
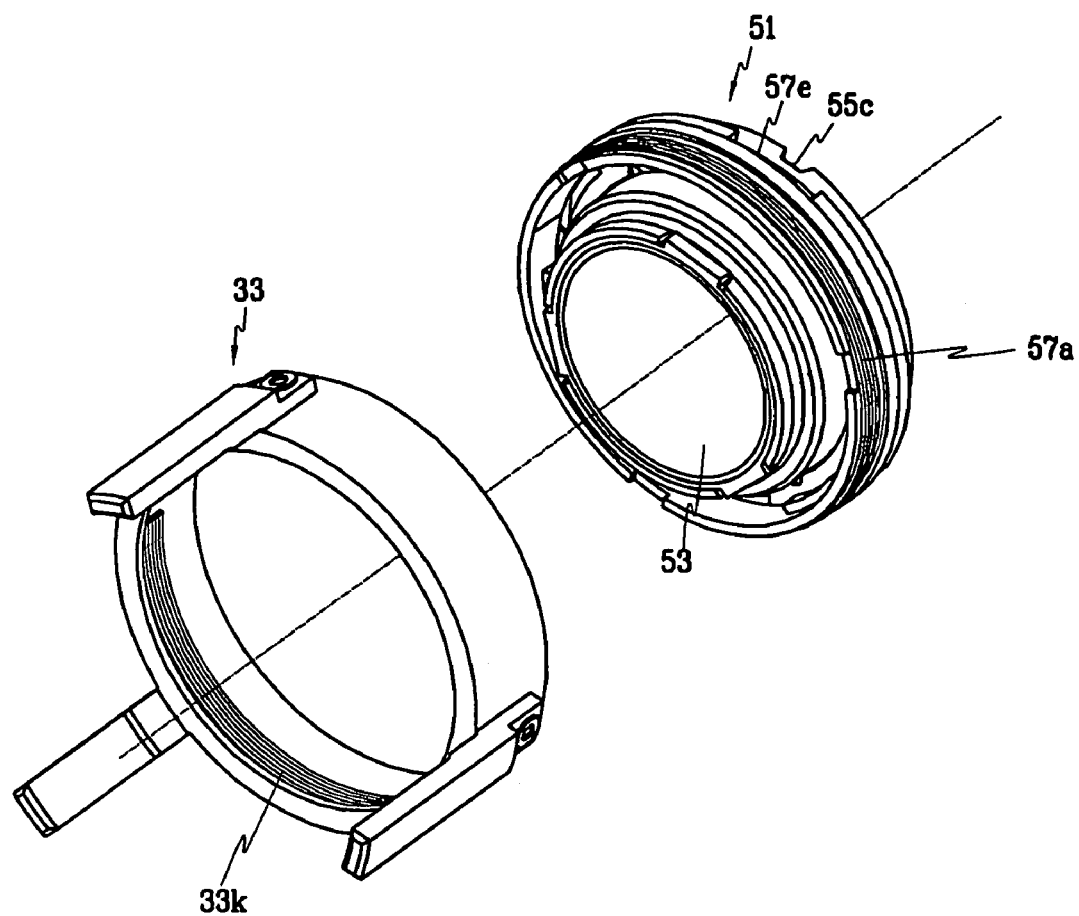
FIG. 6 is an assembled perspective view of the rear lens barrel depicted in FIG. 5.
Figure 7:
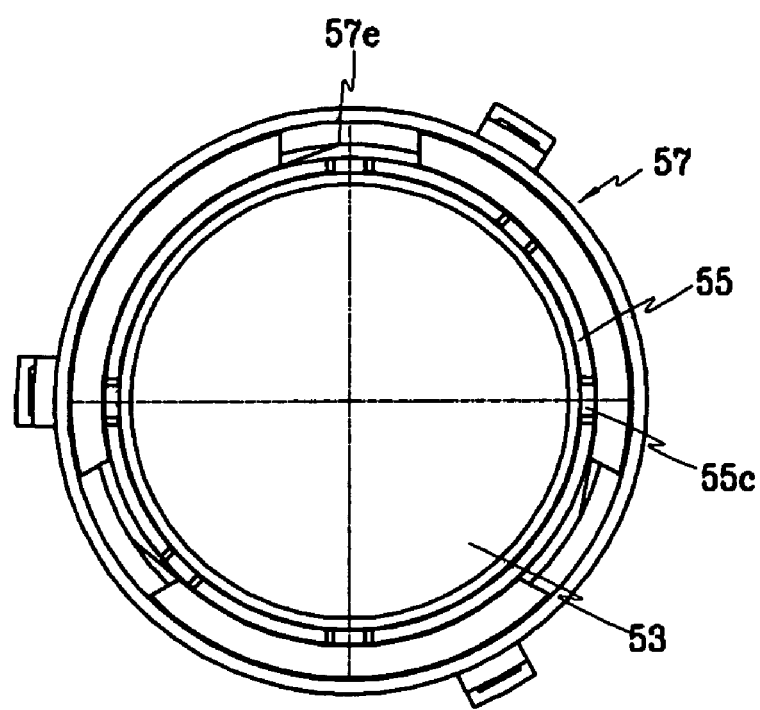
FIG. 7 is an assembled front view of FIG. 5.

The rotational barrel 57 is provided with a focus adjusting groove 57e in order for a worker to be able to rotate the rotational barrel using a tool such as a pincette (see FIGS. 5–7). The rear lens frame 55 is also provided with a resolution power adjusting groove 55c in order for the worker to be able to rotate the rear lens frame 55 using the pincette (see FIGS. 5–7).

An operation process for moving the zoom lens barrel assembly in the direction of the optical axis will be described hereinafter.

When the tele or wide switch 7 or 9 is manipulated with the camera power turned on, the zoom motor 3 is driven to rotate the barrel idle gear 23 through the power transmission gear group 5. As the barrel idle gear 23 is engaged with the gear 29b of the cam ring 29, the cam ring 29 also rotates as the helicoids projection 29a of the cam ring 29 slides along the helicoids groove 27a of the lens base 27 to move in the direction of the optical axis. As the cam ring 29 and the guide ring 31 move in the direction of the optical axis, the rear lens guide ring 33 and the zoom ring 35 also move in the direction of the optical axis.

The front lens barrel 43 moves in the direction of the optical axis in response to the movement of the zoom ring 35, thereby realizing a zooming operation.

A process for assembling the rear lens guide ring 33 with the rear lens barrel assembly 51 and a process for adjusting the focus and resolution power will be described hereinafter.

Describing first the process for assembling the rear lens guide ring 33 with the rear lens barrel assembly 51, the second projections 57c of the rotational barrel 57 are first inserted through the grooves 55b of the rear lens frame 55 such that the third projection 55a of the rear lens frame 55 contacts the first projection 57b of the rotational barrel 57 so as to be stopped at a predetermined location. Then, the rear lens frame 55 is rotated in a direction, and the third projection 55a of the rear lens frame 55 is blocked to move backwards by the second projection 57c of the rotational barrel 57 so as not to be removed towards the subject but to be positioned at a predetermined location. As such, the outer circumference of the rear lens frame 55 can rotate along the guide portion 57d of the rotational barrel 57. Furthermore, by rotating the fixing plate 59 in a direction with the second projections 57c of the rotational barrel 57 inserted through the grooves 59a of the fixing plate 59, the third projections 55a of the rear lens frame 55 contact the fourth projections 59b of the fixing plate 59 in order to stop the rear lens frame 55 from being removed toward the subject. Since the fixing plate 59 has the first and second projections 59a and 59b spaced away from each other by an interval of 120°, it prevents the rear lens frame 55 from being removed even when the rear lens frame 55 rotates above a certain angle.

After that, the male screw formed on the outer circumference of the rotational barrel 57 is engaged with the thread groove 33k formed on the inner circumference of the rear lens guide ring 33.

A process for adjusting the focus and resolution power will be described hereinafter.

The rear lens guide ring 33 and the rear lens barrel assembly 51 that are assembled to each other or a partly assembled zoom lens barrel assembly is first fixed on a jig. Then, when the rotational barrel 57 is rotated in a direction by a tool such as a pincette inserted in the focus adjusting groove 57e, the rotational barrel 57 rotates along the thread groove 33k of the rear lens guide ring 33 and moves in the direction of the optical axis. As a result, the rear lens 53 also moves together. As this point, the rotation of the rotational barrel 57 is stopped at a location where the focus is optionally realized, after which the rotational barrel 57 and the rear lens guide ring 33 are fixed to each other by, for example, a bonding process.

Thereafter, when the rear lens frame 55 is rotated by the tool inserted in the resolution power adjusting groove 55c, the rear lens frame 55 rotates. At this point, the rear lens frame 55 does not move in the direction of the optical axis, but only rotates. The worker then fixes the rear lens frame 55 on the rotational barrel 57 at a location where the resolution power at the upper, lower, left and right periphery becomes maximum while referring to the resolution power chart.

As described above, the zoom lens camera of the present invention is designed to adjust the focus as well as the resolution power by simply adjusting the front and/or rear lens groups, thereby improving the camera imaging quality.

Meanwhile, a film camera is generally designed to adjust its focus and resolution power by adjusting a rear lens group proximal to the film as described above while a digital still camera is often designed to adjust the focus and resolution power by adjusting a front lens group proximal to the subject. Even though the present invention has been described with embodiments adjusting the rear lens group, it is not limited thereto. Therefore, the present invention is applicable to adjust either the front or rear lens groups, accordingly, the present invention can be applied to both the film and digital still cameras. Likewise, utilizing a similar or equivalent construction as described in this disclosure or known in the art, adjustment of the focus and the resolution power of a zoom camera by adjusting the front lens group is particularly contemplated by this invention.

In addition, when there is a focus error and/or a resolution power error by the production tolerances of the optical components, since the barrel of the present invention is designed to be adjusted in a state where it is assembled and fixed on a jig, such errors can be effectively adjusted, thereby improving reliability of the products and reducing the manufacturing costs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A zoom lens barrel assembly for a camera, comprising:
   a plurality of lens barrels for performing a zooming and focusing operation while reciprocating in a direction of an optical axis;
   a rotational barrel coupled with one of the plurality of lens barrels and configured to rotate and move in the direction of the optical axis for adjusting the focus of the zoom lens barrel assembly; and
   a lens frame comprising a lens and rotatably coupled with the rotational barrel for adjusting a resolution power of the lens barrel assembly.

2. The zoom lens barrel assembly of claim 1, further comprising a lens guide ring for adjustably attaching the rotational barrel and the lens frame thereto.

3. The zoom lens barrel assembly of claim 2, wherein the lens guide ring includes an inner circumferential screw and the rotational barrel includes an outer circumferential screw for attachment of the rotational barrel to the lens guide ring.

4. The zoom lens barrel assembly of claim 3, wherein the screws of the lens guide ring and the rotational barrel are further usable for the adjustment of the focus of the zoom lens barrel assembly by rotating and moving the rotational barrel relative to the lens guide ring.

5. The zoom lens barrel assembly of claim 4, wherein the rotational barrel includes an adjusting groove for facilitating the rotation of the rotational barrel relative to the lens guide ring.

6. The zoom lens barrel assembly of claim 3, wherein the rotational barrel and the lens frame respectively comprise a plurality of guide projections for guiding rotation of the lens frame relative to the rotational barrel for the adjustment of the resolution power of the zoom lens barrel assembly.

7. The zoom lens barrel assembly of claim 6, wherein the lens frame includes an adjusting groove for facilitating the rotation of the lens frame relative to the rotational barrel.

8. The zoom lens barrel assembly of claim 6, further including a fixing plate coupled with the rotational barrel and the lens frame for preventing the lens frame from removing from the rotational barrel.

9. A zoom camera having a lens barrel assembly, the lens barrel assembly of the camera comprising:
   a plurality of lens barrels reciprocating in a direction of an optical axis for a zooming operation of the camera via a driving source of the camera;
   a lens guide ring coupled to one of the lens barrels and movable in the direction of the optical axis, the lens guide ring including a circumferential screw at an inner circumference of the lens guide ring;
   a rotational barrel including at an outer circumference a corresponding screw engaged with the screw of the lens guide ring for moving the rotational barrel in the direction of the optical axis by rotating the rotational barrel to adjust the focus of the camera, the rotational barrel including a rotation guide formed at an inner circumference thereof; and
   a lens frame comprising a lens, the lens frame coupled with the rotation guide of the rotational barrel and rotatable relative to the rotational barrel to adjust a resolution power of the camera.

10. The zoom camera of claim 9, further comprising a fixing plate coupled to the rotational barrel and the lens frame for preventing the lens frame from removing from the rotational barrel.

11. The zoom camera of claim 9, wherein the rotational barrel includes a focus adjusting groove for facilitating the rotation of the rotational barrel for moving the rotational barrel in the direction of the optical axis to adjust the focus.

12. The zoom camera of claim 9, wherein the lens frame includes a resolution power adjusting groove for facilitating the rotation of the lens frame for moving the lens frame in the direction of the optical axis to adjust the resolution power.

13. The zoom camera of claim 9, wherein the zoom camera is a film type camera.

14. The zoom camera of claim 9, wherein the zoom camera is a digital camera.

15. A zoom camera having a lens barrel assembly, the lens barrel assembly of the camera comprising:
   a plurality of lens barrels reciprocating in a direction of an optical axis for a zooming operation of the camera via a driving source of the camera;
   a lens guide ring coupled to one of the lens barrels and movable in the direction of the optical axis, the lens guide ring including a circumferential screw at an inner circumference thereof;
   a rotational barrel including at an outer circumference a corresponding screw engaged with the screw of the lens guide ring for moving the rotational barrel in the direction of the optical axis by rotating the rotational barrel to adjust the focus of the camera, the rotational barrel including first and second guide projections at an inner circumference thereof; and a lens frame comprising a lens, the lens frame including a third projection at an outer circumference thereof coupled with the first and second guide projections of the rotational barrel for rotating the lens frame relative to the rotational barrel to adjust a resolution power of the camera.

16. The zoom camera of claim 15, further comprising a fixing plate coupled to the rotational barrel and the lens frame for preventing the lens frame from removing from the rotational barrel.

17. The zoom camera of claim 15, wherein the rotational barrel includes a focus adjusting groove for facilitating the rotation of the rotational barrel for moving the rotational barrel in the direction of the optical axis to adjust the focus.

18. The zoom camera of claim 15, wherein the lens frame includes a resolution power adjusting groove for facilitating the rotation of the lens frame for moving the lens frame in the direction of the optical axis to adjust the resolution power.

19. The zoom camera of claim 15, wherein the zoom camera is a film type camera.

20. The zoom camera of claim 15, wherein the zoom camera is a digital camera.

21. A method of adjusting the focus and a resolution power of a camera, comprising:

providing a lens barrel assembly including a rotational barrel and a lens frame having a lens, the rotational barrel and the lens frame coupled with each other;

rotating the rotational barrel for moving the rotational barrel in an optical axis of the lens barrel assembly to adjust the focus of the camera; and rotating the lens frame relative to the rotational barrel to adjust the resolution power of the camera.

22. The method of claim 21, wherein the rotational barrel and the lens frame each include an adjusting groove, and rotation of the rotational barrel and the lens frame is performed by a tool inserted in the adjusting grooves.

* * * * *